United States Patent [19]
Heiman et al.

[11] Patent Number: 5,250,791
[45] Date of Patent: Oct. 5, 1993

[54] SCANNING SYSTEM WITH ADJUSTABLE LIGHT OUTPUT AND/OR SCANNING ANGLE

[75] Inventors: Frederic Heiman, Los Gatos, Calif.; Glenn Spitz, Far Rockaway, N.Y.

[73] Assignee: Symbol Technologies, Inc., Bohemia, N.Y.

[21] Appl. No.: 890,374

[22] Filed: May 26, 1992

Related U.S. Application Data

[60] Continuation of Ser. No. 740,232, Aug. 5, 1991, abandoned, which is a division of Ser. No. 506,674, Apr. 9, 1990, abandoned.

[51] Int. Cl.[5] .............................. G06K 7/10
[52] U.S. Cl. ....................... 235/472; 235/462; 235/467
[58] Field of Search ............... 235/467, 454, 462, 472; 250/568

[56] References Cited

U.S. PATENT DOCUMENTS

| | | | |
|---|---|---|---|
| 3,944,979 | 3/1976 | Kowk | 340/146.3 |
| 4,251,798 | 2/1981 | Swartz et al. | |
| 4,360,798 | 11/1982 | Swartz et al. | |
| 4,369,361 | 1/1983 | Swartz et al. | 235/470 |
| 4,387,297 | 6/1983 | Swartz et al. | 235/462 |
| 4,603,262 | 7/1986 | Eastman et al. | 250/566 |
| 4,652,750 | 3/1987 | Eastman et al. | 235/472 |
| 4,694,182 | 9/1987 | Howard | 250/566 |
| 4,758,717 | 7/1988 | Shepard et al. | 235/472 |
| 4,760,248 | 7/1988 | Swartz et al. | 235/472 |
| 4,766,299 | 8/1988 | Tierney | 235/462 |
| 4,808,804 | 2/1989 | Krichever et al. | 235/462 |
| 4,818,276 | 11/1983 | Yatsunami | 235/462 |
| 4,818,661 | 3/1989 | Krichever et al. | 235/472 |
| 4,820,911 | 4/1989 | Arackellian et al. | 235/462 |
| 4,835,374 | 5/1989 | Swartz et al. | 235/472 |
| 4,871,904 | 10/1989 | Metlitsky et al. | 235/467 |
| 4,877,949 | 10/1989 | Danielson et al. | 235/454 |
| 4,933,538 | 6/1990 | Heiman et al. | 235/462 |

*Primary Examiner*—Harold Pitts
*Attorney, Agent, or Firm*—Arnold, White & Durkee

[57] ABSTRACT

Apparatus for reading bar code symbols including a laser light source, an optical component for scanning a reference plane, and a sensor for detecting the light of variable intensity reflected from the target. A processor determines whether the reflected light represents a spatial variation that could represent a bar code and generates an enabling signal and a controller is provided for modifying the light beam in response to the enabling signal.

25 Claims, 4 Drawing Sheets

SCANNING SYSTEM WITH ADJUSTABLE LIGHT OUTPUT AND/OR SCANNING ANGLE

This application is a continuation of Ser. No. 740,232, filed Aug. 5, 1991, which is a division of Ser. No. 506,674, filed Apr. 9, 1990, both abandoned.

BACKGROUND OF THE INVENTION

1. Field of the Invention

The invention generally relates to laser scanner systems based upon semiconductor light sources for reading indicia of different light reflectivity such as bar code symbols, and more particularly, to scanner systems in which adjustment of the intensity or spatial coverage of the beam is utilized to effect the detection and reading of symbols.

2. Description of the Prior Art

Various types of laser scanning systems are known in the prior art that read bar code symbols. Bar code symbols are applied to a label or surface of an article to form digital representations of information that are used to identify the article or other characteristics thereof. The bar code symbol itself is a coded pattern of indicia comprised of a series of bars of various widths spaced apart from one another to bound spaces of various widths. A laser scanner reads the symbol and decodes it into the digital representation representing the encoded information.

Various types of scanner systems are exemplified by U.S. Pat. Nos. 4,251,798; 4,360,798; 4,369,361; 4,387,297; 4,593,186; 4,496,831; 4,409,470; 4,460,120; 4,607,156 and 4,673,803—all of such patents being owned by the assignee of the instant invention and being incorporated by reference herein. Such scanners have generally been designed to read bar code symbols, particularly of the Universal Product Code (UPC) type, and operate at a certain working or reading distance from the symbol at a hand-held or stationary position.

Typically, a scanner includes a light source such as a laser or semiconductor device that generates a light beam which is optically modified to form a beam spot of a certain size. It is preferred that the beam spot size be relatively small, generally the same as or less than the minimum width between regions of different light reflectivity, i.e. the bars and spaces of the symbol. However, in practice it is not actually necessary that the spot size be so limited. The relative size of the bars and spaces is determined by the type of coding used to represent characters, as is the actual size of the bars and spaces. The number of characters per inch represented by the bar code symbol is referred to as the density of the symbol.

The beam is directed by optical components along a light path toward a target that includes a bar code symbol on the surface. A scanning component may either sweep the beam spot across the symbol and trace a scan line across and past the symbol, or scan the field of view of the photodetector, or do both. A scanner also includes a sensor or photodetector. The photodetector has a field of view extending across and slightly past the symbol and functions to detect light of variable intensity reflected off the symbol. The photodetector generates electrical signals representative of the sequence of bars and spaces in the symbol. The electrical signals are then decoded into data descriptive of the symbol.

The use of semiconductor devices as the light source in scanner system are especially desirable because of their small size, low cost and low power requirements. However, there are some drawbacks to the use of semiconductor devices in some applications.

First, some semiconductor lasers, especially those emitting light in the visible portion of the spectrum, have a relatively limited lifetime. The reflective facets which define the lasing cavity are relatively thin layers which degrade in reflectively over time. As a result, the effective output power of the laser also declines, which limits the operational effectiveness of the scanner.

As we will note later, since such degradation is proportional to the current applied to the diode. Of course, if the current applied is lowered, the device will have a longer lifetime.

In addition to gradual degradation, other degradation mechanisms are (1) catastrophic degradation, and (2) dark-line defect formation.

In catastrophic degradation, the laser mirror under high-power operation is permanently damaged by pits or grooves forming on the mirror.

The dark-line defect is a network of dislocations that can form during laser operation. Once started, it can grow expansively in a few hours, causing the threshold current density to increase.

Another disadvantage of the use of semiconductor lasers is that the rise in temperature associated with constant-on or high duty cycle operation will further reduce lifetime.

Still another disadvantage of semiconductor lasers presently available commercially is their relatively low visibility, compared, for example, to the visibility of the beam from a HeNe gas laser. Such low visibility is due to their high wavelength, about 680 nanometers.

Prior to the present invention there has not been a satisfactory way to overcome the disadvantages of using a visible semiconductor laser in a scanning system for reading bar code symbols.

SUMMARY OF THE INVENTION

1. Objects of the Invention

It is an object of the invention to provide a method and a device for reading coded indicia such as bar code symbols which is operable in both a low power mode and a high power mode in order to prolong the operational lifetime of the semiconductor light source.

It is another object of the invention to provide a method and a device for reading coded indicia which simultaneously adjusts the scanning angle of the emitted light and the power level of the emitted light.

It is yet another object of the invention to provide a device for reading coded indicia that includes a processing circuit that determines whether the reflected light of variable intensity represents a spatial variation that could be indicative of a predetermined indicia pattern.

2. Features of the Invention

Briefly, and in general terms, the present invention provides a method and an apparatus for detecting indicia having portions of different light reflectivity such as bar code symbols. The invention includes a light source for emitting a light beam; and an optical component disposed in the path of the beam for optically modifying and directing the light beam along an optical path toward a target located in the vicinity of a reference plane lying generally normal to the optical path so as to scan spatially adjacent portions of the reference plane. The invention further includes a sensor having a field of view operative for detecting at least a portion of light of variable intensity reflected off the target, and for generating and electrical signal indicative of the detected light intensity. The electrical signal from the sensor is processed to produce a test signal to determine whether the reflected light of variable intensity represents a spatial variation of different light reflectivity that could be indicative of the presence of a predetermined indicia pattern, and for generating an enabling signal if the test signal exceeds a predetermined reference signal. The light beam is then modified in response to the enabling signal.

In another embodiment, the present invention provides a method and an apparatus for reading coded indicia on the surface of a target including a light source for illuminating the target, a detector for receiving at least a portion of the light reflected from the target, a decoder for decoding the reflected intensities of light into representations of the coded indicia, and a controller for operating the light source in a low power first mode and a high power second mode.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWING

FIG. 6b is a highly simplified graph of the voltage at an internal node of the detection circuit corresponding to scanning the bar code symbol illustrated in FIG. 6a.

In the several Figures, like reference numerals identify like parts.

DESCRIPTION OF THE PREFERRED EMBODIMENTS

Figure 1:
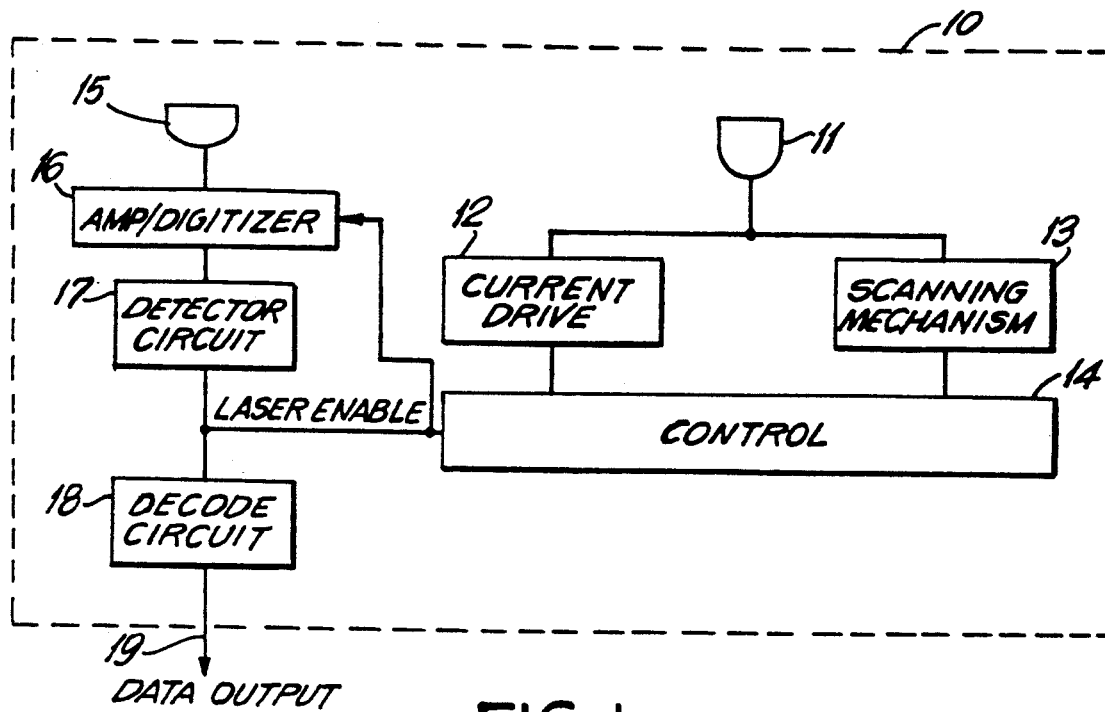
FIG. 1 shows a highly simplified block diagram of a first embodiment of an apparatus for reading coded indicia such as bar code symbols according to the present invention.
Figure 2:
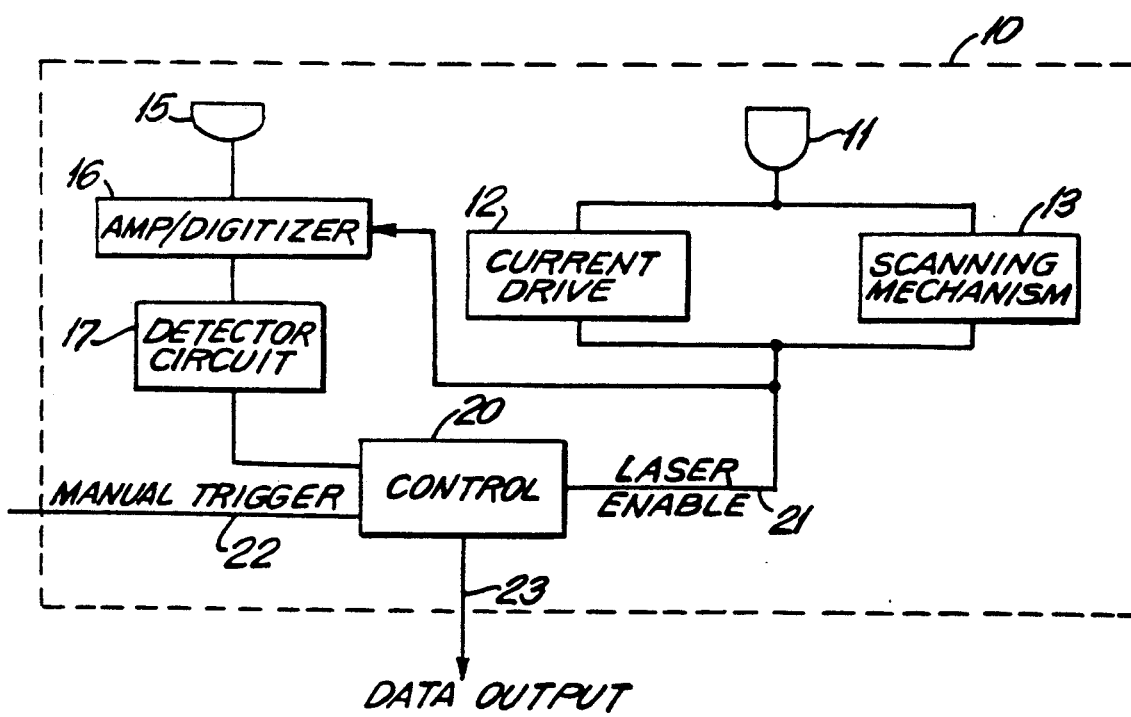
FIG. 2 shows a highly simplified block diagram of a second embodiment of a apparatus for reading coded indicia such as bar code symbols according to the present invention.

The invention generally relates to scanner systems based upon semiconductor light sources for reading indicia of different light reflectivity such as bar code symbols. More particularly, the invention provides a scanner system in which adjustment of the intensity or spatial coverage of the beam is automatically made to effect appropriate detection, sweeping and/or scanning of symbols to be read. The invention further provides a method for operating a scanner system by providing a signal to the current drive of the light source and the scan controller in response to detection of indicia which represents or may represent a portion of a desired target, such as a bar code symbol. Referring generally to FIGS. 1 and 2, there are shown highly simplified block diagrams of embodiments of an apparatus for reading coded indicia, such as bar code symbols, according to the present invention. More particularly, reference numeral 10 generally identifies a preferably hand-held, fully portable scanning system for detecting, scanning, reading and/or analyzing bar code symbols. Typical symbol bar codes in current use are the Universal Product Code (UPC), EAN, Codabar and Code 39.

In the preferred embodiment of the present invention, the light source is a semiconductor laser. As we have noted previously, there are a number of drawbacks to operating a semiconductor laser scanner at full power over long periods of time, or under high duty cycle operation. First, some visible semiconductor lasers have a relatively limited lifetime. The reflective facets which define the lasing cavity are relatively thin layers which degrade in reflectively over time. As a result, the effective output power of the laser also declines, which limits the operational effectiveness of the scanner. However, such degradation increases as the current is applied to the diode; indeed, if the current applied is below the threshold current, the device will not lase at all. Under such conditions, the device will merely emit light by a process of spontaneous emission. Under conditions of low power, but above threshold, the operational lifetime of the device may be extended over ten times, compared to that of a semiconductor laser operating at full power, e.g. up to 70,000 hours, or about 8 years, assuming constant-on conditions. Since scanners are not typically operated in constant-on conditions, but in fact over much more limited conditions, in actual practice the increase in operational lifetime is considerable.

The second drawback is that, although most semiconductor laser diodes used in scanners today emit light at 780 nm, there is significant interest in lasers at a relatively shorter wavelength (i.e. 680 nm), which under certain conditions are visible to human eye. The sensitivity of the human eye to such wavelengths is relatively poor. As a result, the use of such light sources present the drawback that over large scan angles (e.g. more than about 15 degrees) the amount of light reflected from the target at the typical operational distance may not be visible to the eye of the user. Thus, the user cannot visually verify that the scanning is taking place over the symbol. Although various techniques may be utilized to overcome such limitation, including the use of an aiming light such as described in U.S. patent application Ser. No. 706,502, such techniques detract from the simplicity of design and use which is desirable, especially in hand-held scanning devices.

The present invention also relates to scanning systems incorporating techniques for automatically initiating and terminating scanning of the target. One feature of some scanner systems is the use of a manually operated trigger to initiate scanning of the target, such as described in U.S. Pat. No. 4,387,297. Although for many applications the use of a trigger is an important feature, there are some applications in which it may be desirable to use alternate activation techniques to initiating scanning.

The present invention provides a method and apparatus for operating a semiconductor laser in a scanning system which eliminates the need for a trigger to initiate scanning and also minimizes the operational time of the laser at high power. The present invention also provides a technique for adjusting the spatial coverage or sweep of the beam in order to maximize the reflected intensity visible to the user while also effecting a sufficient sweep to fully read.

FIG. 1 shows a highly simplified block diagram of a first embodiment of an apparatus for reading coded indicia such as barcode symbols according to the present invention. The arrangement 10 may be implemented in a hand-held unit, mounted on a moveable stand, or incorporated in a fixed assembly such as a table-top or other equipment. The arrangement includes a light source 11 for illuminating a target with a light beam. The light source 11 may be any source of intense light suitably selected for maximizing the reflectivity from the target, and may be a gas or semiconductor laser.

The arrangement 10 also includes a driver 12 connected to light source 11 for adjusting the intensity of the emitted light beam in accordance with a control signal from a first control unit 14.

The driver 12 is usually a current driver since in the preferred embodiment the light source is a semiconductor laser and one may adjust the light output of such a laser by increasing the forward current through the p-n junction of the laser. In the case the light source is not a laser, a suitable driver 12 is provided which is adapted to the emission characteristics of the light source 11 so as to vary the intensity of the output.

A scanning mechanism 13 is also provided which is operatively associated with the light source 11 for directing the light beam along a path to the target. The present invention is operable in a variety of different modes and in different arrangements to direct the light beam at the target. Since the coded indicia may be only a small portion of the field of view from the light source 11, it is often desirable to scan or sweep over a large spatial region to ensure that the sweep passes through the entire coded indicia. Thus, it may be desirable to scan in a pattern over a two dimensional region, such as described in U.S. patent application No. 138,563 of the present assignee.

It is also desirable to employ a cyclically repeating scanning mechanism 13 to ensure that the indicia are read not just once during a single scan but are read a plurality of times during repeated scans, thereby increasing the reliability of the reading process and minimizing the possibility of error. Scanning mechanisms based upon optical, electronic, or mechanical techniques, either alone or in combination, are within the scope of the present invention, and such techniques are not necessarily limited to scanning or sweeping a light beam using a mirror such as in the arrangements described in the prior art patents noted above.

The arrangement 10 also includes a photodetector 15 for detecting the light reflected from the symbol and generating an electrical analog signal indicative of the detected variable light intensity. Since the symbol is swept with the light beam, the reflected light has a variable intensity as a function of time, corresponding to the reflections from the bars and spaces of the symbol. The output from the photodetector 15 is applied to amplifier (and digitizer) 16 which has an appropriate gain parameter which is preferably determined according to the working distance to the target. A detector circuit 17 is provided that functions to detect a certain pattern that represents a portion of a bar code symbol and is connected to the amplifier and digitizer 16.

An example of such a detector circuit 17 will be discussed at a later point in connection with FIG. 4. In one embodiment of the present invention, the gain characteristics of the amplifier may be adjusted depending upon level of the output of the photodetector 15 in addition to a control signal from the detector circuit 17.

More particularly, the present invention provides an amplifier 16 having an adjustable gain characteristic. The amplifier is connected to the sensor photodetector 15 and functions to convert the relatively weak electrical signal from the photodetector 15 into an amplified signal. The amplified signal is then digitized and applied to the detector circuit 17 for further processing according to the present invention. The detector circuit may also function to apply a feedback signal to the amplifier/digitizer 16 and thereby control the gain characteristic of the amplifier. In one embodiment of the present invention the detector circuit 17 generates an output signal which we designate as a "laser enable" signal. Such a signal signifies that a portion of a bar code symbol has been detected. The "laser enable" signal is applied to the first control unit 14 to modify the light output from the light source 11 and/or signal the scanning mechanism 13 to change the angle of scan. The "laser enable" signal may also be used to activate a decode circuit 18 which will function to decode the signal received from the photodetector 15. Once activated, the decode circuit 18 is operative to receive data directly from the amplifier/digitizer 16, bypassing the detector circuit 17. The data output 19 from the decoder 18 can then pass the decoded data outside of the laser scanner in order to be used in a point-of-sale system. The enable signal may also be used as a feedback signal to control the gain characteristic of the amplifier/digitizer 16.

FIG. 2 shows a highly simplified block diagram of a second embodiment of an apparatus for reading bar code symbols. The light source 11, the current drive 12, the scanning mechanism 13, the photodetector 15, and the amplifier/digitizer 16 may be the same as that described in connection with FIG. 1 and are identified by like reference numerals.

In the embodiment of FIG. 2, the system architecture is slightly different in that a manual trigger 22 turns the light source 11 on, and a second control unit 20 is provided which is responsive to the output of the detector circuit 17 to generate the laser enable signal 21. The manual trigger 22 initiates a "spot" mode of operation as will be subsequently described. The laser enable signal 21 is connected to both the current drive 12 and the scanning mechanism 13 to modify the light output from the light source 11, and/or signal the scanning mechanism 13 to change the angle of scan. Once the control unit 20 is activated by either the output of the detector circuit 17, it will function to transfer data generated by the photodetector 15 to a data output line or connector 23. As in the embodiment of FIG. 1, the enable signal may also be used as a feedback signal to control the gain characteristic of the amplifier/digitizer 16. Turning next to FIG. 3, there is shown a sequence of views as a target containing a symbol is scanned by a light source 11 to show the operation of the present invention in one embodiment.

As suggested from the highly simplified discussion in connection with FIG. 3, a feature of the present invention is to provide a circuit which is capable of sampling the reflected light from only a portion of a target and performing a computation or analysis on the detected electrical signal to determine if the detected portion is indicative that a bar code symbol has been detected. The preferred embodiment of such a detector circuit 17 will be subsequently described.

One technique according to the present invention is to process the electrical signal to produce a test signal to determine if the reflected light of variable intensity represents a spatial variation of different light reflectivity that could be indicative of the presence of a predetermined indicia pattern such as a bar code symbol.

An enabling signal would then be generated if the test signal exceeds a predetermined reference signal. The light beam is then modified in response to the enabling signal in one or more respects as will be subsequently described.

Another technique according to the present invention is to process the electrical signal to produce a count of the number of transitions between portions of different light reflectivity during a predetermined time period. The count would be used to determine whether the reflected light of different light reflectivity is indicative of a presence of a predetermined indicia pattern such as a generic bar code symbol, a class of bar code symbols, or even a specific bar code symbol. An enabling signal would be generated if the count exceeds a predetermined minimum. Again, the light beam would be modified in response to the enabling signal.

Still another technique according to the present invention is to process the electrical signal to compute the ratio of the length of a indicia portion of low light reflectivity to one of high reflectivity to determine whether the reflected light of variable intensity represents a spatial variation of different light reflectivity that could be indicative of a presence of a predetermined indicia pattern and for generating an enabling signal if the ratio is less than a predetermined value. The light beam would be modified in response to the enabling signal.

Yet another technique according to the present invention is to process the electrical signal to compare the signal from a first scan with the signal from a second subsequent scan to determine whether the reflected light of variable intensity over successive scans represents a substantially identical spatial variation of different light reflectivity that could be indicative of a presence of a predetermined indicia pattern. An enabling signal is generated if the comparison between a predetermined number of successive scans results in identical match. The light beam would be modified in response to the enabling signal.

Figure 3A:
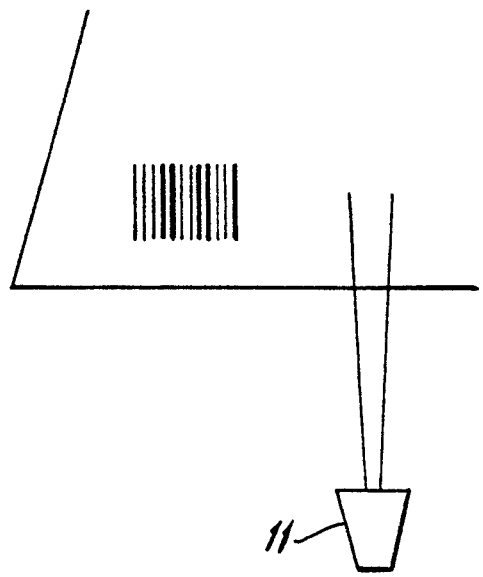
FIG. 3a is a highly simplified schematic representation of the operation of the apparatus of the present invention during a first stage of operation in which coded indicia are not present in the scanning pattern of the emitted light.

FIG. 3a is a highly simplified schematic representation of the operation of the apparatus of the present invention during a first stage of operation in which coded indicia are not present in the scanning pattern of the emitted light.

Figure 3B:
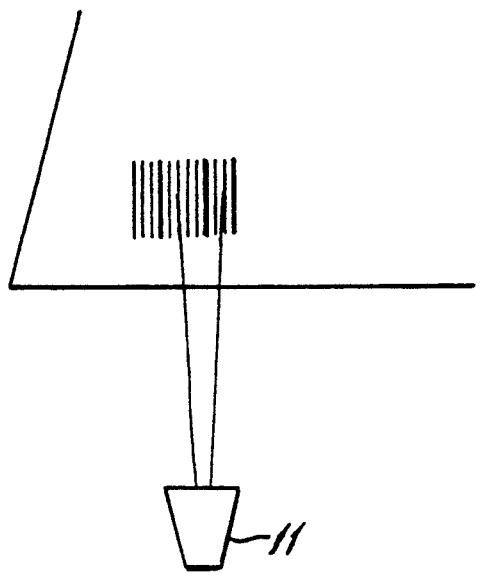
FIG. 3b is a highly simplified schematic representation of the operation of the apparatus of present invention during a second stage of operation in which a portion of a coded indicia are present in the scanning pattern of the emitted light.

The operation of the present invention begins when a portion of a coded indicia is present in the scanning pattern, i.e. at the second stage shown in FIG. 3b. As the scanner is moved to the location of the coded indicia, a portion of a coded indicia will be present in the scanning pattern of the emitted light from the light source 11. The detector circuit 17 is now operative to detect a portion of a symbol and will generate a laser enable signal, and shift operation of the apparatus into a third stage of operation.

Figure 3C:
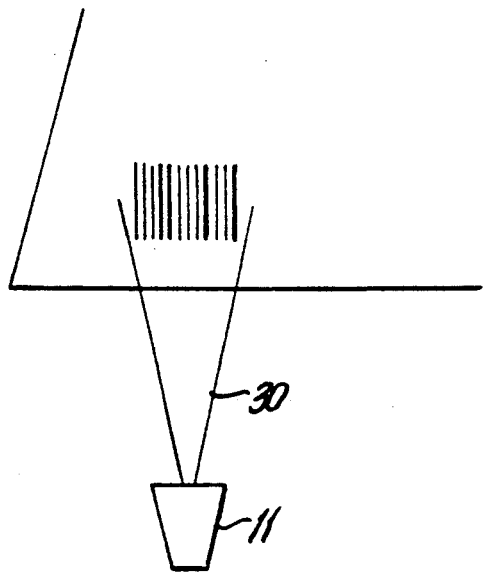
FIG. 3c is a highly simplified schematic representation of the operation of the apparatus of the present invention during a third stage of operation in which-the entire coded indicia is present in the scanning pattern of the emitted light.

FIG. 3c is a highly simplified schematic representation of the operation of the apparatus of the present invention during a third stage of operation in which the entire coded indicia is present in the scanning pattern of the emitted light. The indicia will then be read, decoded, and data transferred, as will be subsequently described.

Figure 3D:
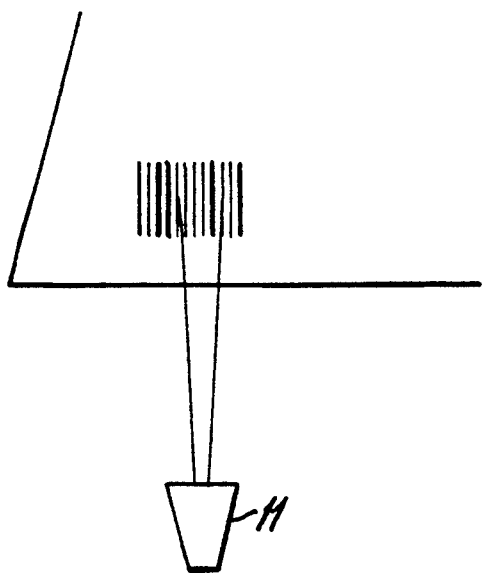
FIG. 3d is a highly simplified schematic representation of the operation of the apparatus of the present invention during a fourth stage of operation after the indicia has been read and in which the entire coded indicia is still present in the scanning pattern of the emitted light.

FIG. 3d is a highly simplified schematic representation of the operation of the apparatus of the present invention during a fourth stage of operation after the indicia has been read and in which the entire coded indicia is still present in the scanning pattern of the emitted light. As shown in the Figure, the light beam has now narrowed so that only a portion of the indicia are covered by the beam.

As suggested from the highly simplified discussion in connection with FIG. 3, a feature of the present invention is to provide a circuit which is capable of sampling the reflected light from only a portion of a target and performing a computation or analysis to determine if the detected portion is indicative that a bar code symbol has been detected. According to the embodiment shown in FIG. 3, the result of the computation or analysis may be used to change the scanning angle or length of the scanning path between the second and third stages, as well as between the third and fourth stages of operation.

In other embodiments, another parameter characteristic of the light beam may be modified, such as the intensity, the spot size at the reference plane, or the rate of scanning.

Once the entire coded indicia has been decoded, it is no longer necessary to maintain the scanning angle 30 (and/or perhaps a high level of light intensity from the light source 11 as well) in third stage. Thus after a predetermined time-out period, the light beam of the apparatus will revert back to substantially the same configuration as the first stage, as shown in FIG. 3d. In such a situation, the detector circuit 16 will be inhibited even though a portion of a symbol is being detected.

To summarize the operation of the scanner according to the present invention, one feature of the present invention is to provide a circuit which is capable of sampling the reflected light from only a portion of a target and performing a computation or analysis to determine if the detected portion is indicative that a bar code symbol has been detected. Once it has been determined that a bar code symbol has been detected, some characteristic of the light beam is modified in order to complete the scanning and decoding operation.

The particular characteristic of the light beam that should be modified depends upon the designing and application of the scanner, and the mode of operation of the scanner. Before turning to a more detailed description of the embodiments of the present invention, it would be worthwhile to discuss the design feature of a laser scanner that have some impact on the implementation of the present invention.

In the design of the laser scanner, there are various technical characteristics that can be considered some of which (such as the nature of the light beam) can be adjusted and modified using the principles of the present invention during the scanning process. The discussion of such characteristics hereunder is not intended to limit or circumscribe the scope of the present invention, but is meant to illustrate the possible application of the technical features of the present invention to both laser design factors and specific user considerations. Following a discussion of such technical characteristics, we will consider application-specific characteristics such as scanning modes.

The characteristics we shall discuss include: the brightness of the laser beam (i.e. the effective power output), regulatory requirements and standards, and technical performance characteristics (such as laser lifetime, cost of design, manufacturability, and similar characteristics).

The brightness of the laser beam reflecting from the surface of the target is a critical parameter in the design of a laser scanner, particularly a hand-held laser scanner. Since such scanners are aimed by the user by pointing the beam at the bar code, it is important that the reflective beam from the laser be sufficiently perceptible to the user under a wide variety of ambient light conditions to make aiming not only possible but easy to use. The brightness of the laser beam is a function of a number of different parameters, including the wavelength of the laser light (since the eye has varying sensitivities depending upon wavelength, and in particular the lower the wavelength in the red region the more sensitive the eye is to respond to the reflective beam), the size of the spot, the power, and the length of the path over which the beam is swept in a scanning mode.

Since the wavelength of the laser diode is relatively fixed, and the spot size is determined by resolution, the designer typically has only the two parameters of the power and scanning length to vary. The variation of either or both of such parameters may be utilized in a given application. The parameters may be changed at periodic intervals during operation, or may be triggered by the user. For example, in an operational mode the brightness is maximized only while the user is searching for the target and using the beam to aim the scanner—such mode may be called an "aim" mode.

Another technical characteristics pertaining to laser scanners are regulatory requirements and standards. Such regulatory standards are often concerned with the amount of power emitted by the laser over a period of time.

For example, the Center for Devices and Radiological Health (CDRH) categorizes laser devices into four classes, Class I through Class IV. A Class I laser emits a maximum of 0.39 microwatts radiant power for a time period of greater than 10,000 seconds. Such a device is very low power and offers very little danger to health or safety. Class IIa lasers emit a maximum of 3.9 microwatts radiant power over a time period of greater than 1,000 seconds. Class II devices require a simple cautionary label bearing the words "CAUTION" and a starburst symbol, and an aperture label bearing the words "Avoid exposure—laser light is emitted from this aperture." The Class II warning logtype contains the word "Caution", the phrases "Laser light—do not stare into beam", "Class II laser product", a phrase describing the laser medium and output power, and the starburst symbol. The present invention is also useful to insure compliance with regulatory standards concerning laser light emission. By emitting a high power beam over a relatively short period of time, the laser according to the present invention will lie within regulatory constraints yet permit a bright enough spot to be generated on the reference plane so as to enable a user to perceive it and make use of it for aiming the laser scanner. Depending upon the particular constraints of the specific regulation, the power output, spot size, scanning angle, scan speed or other parameters of the laser scanner may be suitably chosen by the designer so as to optimize visibility of the beam to the user while still conforming to regulatory specifications for a particular class of laser.

The features of the present invention may also be utilized to operate the laser scanner in different scanning modes.

There are three possible scanning modes that we might consider for a hand-held laser scanner according to the present invention: (a) the normal triggered mode; (b) the triggered spot and scan mode; and (c) the object sensor mode.

In the normal triggered mode, the laser beam is normally off. A trigger is used in the normal triggered mode to initiate the rapid and repetitive scanning-of the target symbol. For proper operation, it is necessary to distinguish between whether many scans have been performed for one object, or whether one scan has been performed for many objects. The capability of sensing each object to be scanned in its turn is critical for successful decoding.

As is known in prior art scanners (such as described in U.S. Pat. No. 4,387,297) a trigger is operative for actuating the scanning means to repetitively sweep the barcode symbol a number of times each time the trigger is actuated. The trigger is preferably a manually-depressible switch mounted on the housing in the vicinity of the interconnection of the barrel and handle portions of the housing. The trigger switch is located on the handle portion such that the forefinger of the user's hand can be used to manually depress the switch. Each time the switch is depressed the scanning means sweeps the symbol many times, until a complete decoder or a time out is reached.

In the triggered mode, when the decode circuitry successfully decodes the symbol, the decode circuitry generates a successful decode signal and may actuate the indicator means located in the scanner. The indicator means comprises and auditory-type beeper and/or a light emitting diode. When the beeper sounds and/or when the diode lights up, then the user knows that the scanning for that particular symbol has been terminated.

In the triggered spot and scan mode, after the trigger is pulled, the beam comes on at a narrow angle. In such an operational mode, a very bright, short line about 1" in length is formed by the laser narrow scanning beam. The bright small line is used by the user holding the laser scanner to manually aim and direct the beam to the location where the user actually sees the barcode is located. When an indicia pattern indicative of a barcode symbol has been detected, the beam will widen thereby sweeping the entire symbol so that it can be decoded. The beam may be dimly reflective or not visible to the user, but the decode will take place. It is desirable but not necessary that the system detect a barcode only when the bright line is on a symbol, not text or graphics.

In the object sensor mode, the scanner is triggerless and the constantly on laser beam normally emits at a narrow angle and lower power. When an indicia pattern indicative of a barcode symbol has been detected, the beam will widen, the power will increase, and the beam will read the entire symbol. Any or all of the above operational modes may be utilized on a single laser scanner utilizing the bar code symbol detection techniques according to the present invention. Such operational modes may be chosen manually by the user (such as by setting a switch) or the laser scanner may be dedicated to operate in a specific operational mode. The different laser beam output or scanning parameters discussed-above—beam intensity, angle of scan, etc.—may either be manually selected by the user (such as by setting a switch) or may be automatically determined and dedicated in a particular type of scanner. The particular type of scanning parameter may also conceivably be automatically determined by an analysis of the detected bar code and a computer algorithm may determine the most appropriate subsequent scanning mode to be utilized in order to most effectively and appropriately detect the entire bar code symbol. Such alternative embodiments are all within the range and scope of present invention.

Figure 4:
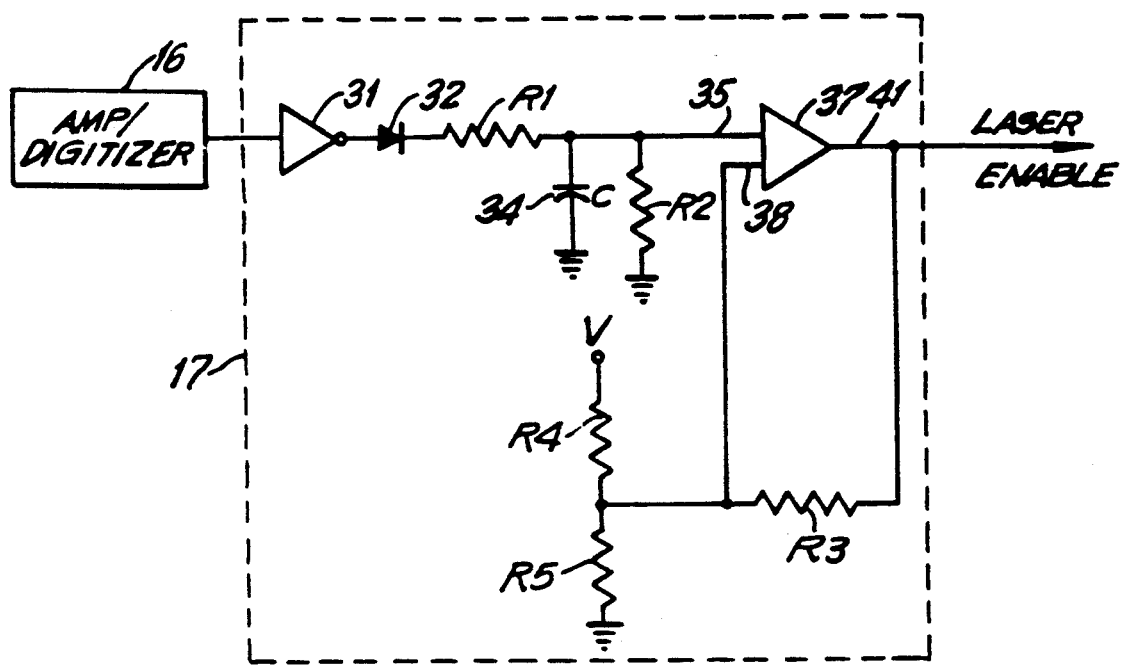
FIG. 4 is a schematic diagram of a detector circuit used in the apparatus according to the present invention.

Turning next to FIG. 4, there is shown a schematic diagram of an embodiment of a preferred detector-circuit 17 according to the present invention. The signal from the amplifier/digitizer 16 is applied to the input of an invertor 31, the output of which is applied to a diode 32. An RC circuit is formed by first resistor R1 and capacitor (C) 34 with the resistor R1 being connected in series between the output of the diode 32 and a first input 35 of an open collector output comparator 37. The capacitor (C) 34 is connected between the first input 35 and ground potential, and a second resistor R2 is connected between first input 35 and ground potential. The resistance value of resistor R1 is preferably much less than that of resistor R2.

The second input 38 of the comparator is connected to the node of a voltage divider formed by resistors R4 and R5 which are connected in series between potential V and ground. The output 41 of the comparator 37 is connected to the "laser enable" signal line, as well as a feedback through a resistor R3. The feedback from the output of the comparator 37 provides a hysteresis effect to the comparison operation since the other terminal of the resistor R3 is connected to the second input 38 of the comparator 37. The operation of the detector circuit 17 can be described as follows: when the digitizer outputs a bar, the capacitor charges up with a time constant of approximately R1C since R2 is much greater than R1. When the digitizer outputs a space, the capacitor discharges through R2 since the diode 32 prevents the discharging through R1. The time constant R2C is much greater than the time constant R1C so that more space time is required to cancel the effect of a bar.

After several bars and spaces of typical density, a voltage is developed on the capacitor 34 which exceeds the threshold which has been set with the use of the comparator 37. At this time, a "trigger" or laser enable signal is output from the comparator 37 to indicate the presence of a bar code.

The open collector output of the comparator 37 is driven low at this point which lowers the threshold of the comparator so that minor voltage changes on the capacitor 34 due to the following bars and spaces, and quiet zone, will not disable the trigger signal.

The circuit as described would also trigger if a long black bar were to be scanned. However, in the preferred embodiment, the digitizer includes a circuit which discriminates against reading a long black bar, i.e. the digitizer functions as a high pass filter. One such digitizer circuit would utilize a time-out so that if a long black bar was scanned, only a short pulse would be generated. When such a short pulse signal is applied to the detector circuit 16, the threshold will not be exceeded and a "trigger" signal will not be output.

The trigger signal will only be released after a relatively long time during which there are no bars digitized. When the scanner is moved away from a symbol, the capacitor will discharge through R2C and the trigger signal will be released which will indicate to the decoding logic or the detector circuit that the same symbol is no longer being scanned.

The bar code sensing circuit depicted in FIG. 4 is one of the key features of the present invention since it is sensitive to a specific pattern of images. The circuitry is responsive to a pattern of high and low reflected light signals to charge and discharge the capacitor 34, with the net charge being utilized to generate a trigger signal after some threshold has been reached.

Figure 6A:
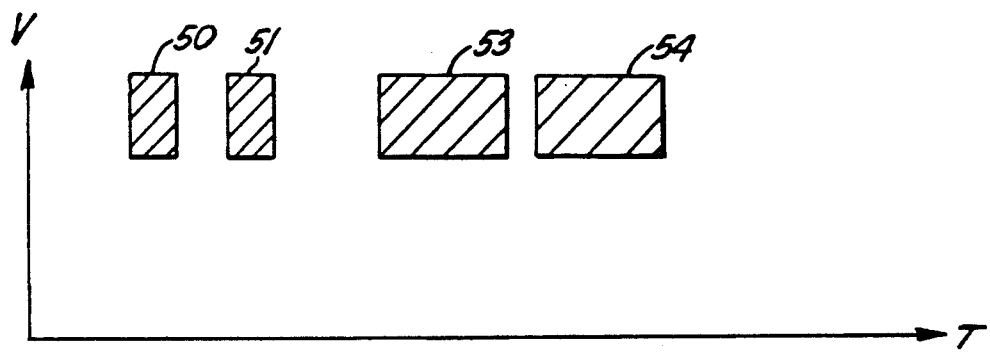
FIG. 6a is a highly simplified, enlarged view of a pattern of bars and spaces such as may be present in a typical symbol.
Figure 6B:
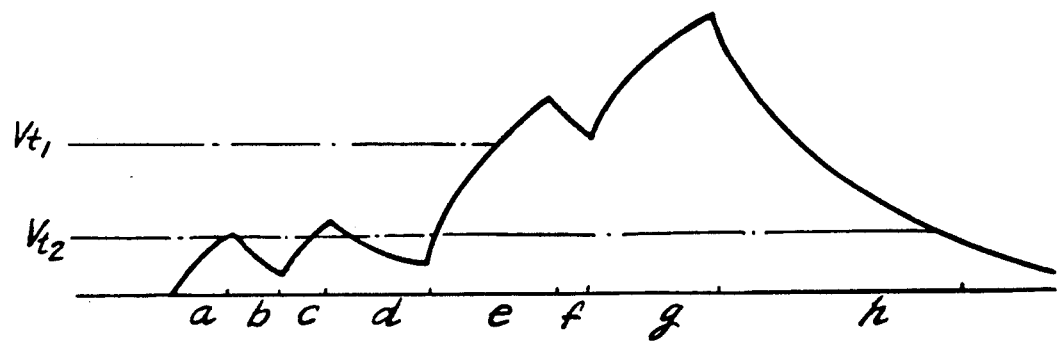

FIG. 6a is a highly simplified enlarged view of a pattern of bars and spaces such as may be present in a typical symbol. FIG. 6b is a graph of the voltage on the line 35 as a function of time corresponding to scanning of the symbol in FIG. 6a from left to right. More particularly, it is seen that as a bar is traversed, the voltage increases somewhat linearly as seen during the time period designated by the reference character a. As a space is traversed, as during the time period designed by the reference character b, there is no charge applied through R1 and the existing charge on the capacitor C is slowly discharged through the resistor R2. As the next bar is encountered during time period c, a voltage is again applied to charge the capacitor through resistor R1.

Figure 6C:
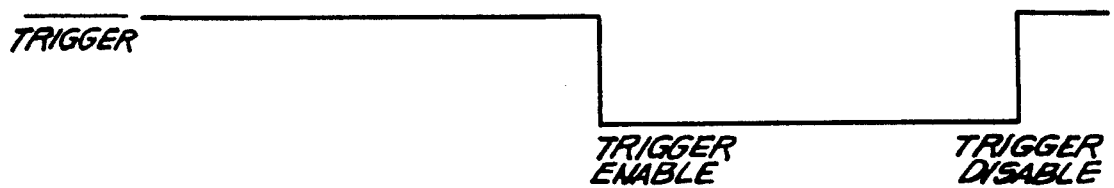
FIG. 6c is a graph of the enabling signal as a function of time corresponding to scanning of the symbol in FIG. 6a from left to right.

As the next space is encountered during the scan, during the period d, there is again no charge applied through the resistor R1 and the existing charge on the capacitor C is again slowly discharged throughout resistor R2. As the next bar is encountered, wide bar 53 during the scan, during the time period e, a voltage is again applied to charge the capacitor C through resistor R1. As seen in FIG. 6b, the total voltage on the line 35 surpasses the threshold voltage Vt during the time period e. As further shown in FIG. 6b, at the time the voltage surpasses the threshold voltage Vt, a trigger enable signal is activated, which is shown in FIG. 6c, by the trigger signal going from a high state to a low state. The voltage on the line 35 continues to increase during the time period e as the bar 53 is scanned. During the time period f in which a space is being scanned, no charge is applied through the resistor R1 and the existing charge on the capacitor C is slowly discharged through the resistor R2. As the next bar 54 is encountered during the time period g, a voltage is again applied to charge the capacitor through resistor R1.

In the embodiment of the present invention, a circuit may be provided to pulse the laser on for long enough time to complete one scan over the field. The circuit would then turn the laser off for some period of time before repeating the cycle. At the end of the period of time during which the laser is on, the laser enable output of the circuit in FIG. 4 is latched and the output of the latch is used in the system as the laser enable output. Since the latch output will not change until the end of the next laser-on period, the discharging of the capacitor C during the laser-off time will not have any effect on the latch output. The parameters R1, R2 and C should be appropriately chosen so the voltage on the capacitor C reaches the steady state condition within one scan time.

During period g, the voltage on C reaches nearly a steady state value which is close to V, i.e. close to the maximum of $V(1-\exp(-t/R1C))$. The voltage will stay near the level V until the bar code no longer appears in the field of view of the photodetector 15. At the time the bar code disappears, the capacitor discharges, as represented by period h in FIG. 4.

The laser enable signal output applied to the control until 14 or 20 may be utilized to detect specific spatial variation patterns through the use of appropriate hardware or software provided in the control unit 14 or 20. For example, through an appropriate selection of parameters for the detection circuit 17, the control unit 14 or 20 may be provided with appropriate logic to count of the number of transitions between portions of different light reflectivity during a predetermined time period. The count would be used to determine whether the reflected light of different light reflectivity is indicative of a presence of a predetermined indicia pattern such as a generic bar code symbol.

The control unit 14 or 20 may also compute the ratio of the length of a indicia portion of low light reflectivity to that of an indicia portion of high light reflectivity to determine whether the reflected light of variable intensity represents a spatial variation of different light reflectivity that could be indicative of a presence of a predetermined indicia pattern and for generating an enabling signal if the ratio is less that a predetermined value.

Yet another application of the control unit 14 or 20 may be to compare the signal from a first scan with the signal from a second subsequent scan to determine whether the reflected light of variable intensity over successive scans represents a substantially identical spatial variation of different light reflectivity that could be indicative of a presence of a predetermined indicia patterns An enabling signal is generated if the comparison between a predetermined number of successive scans results in identical match.

Figure 5:
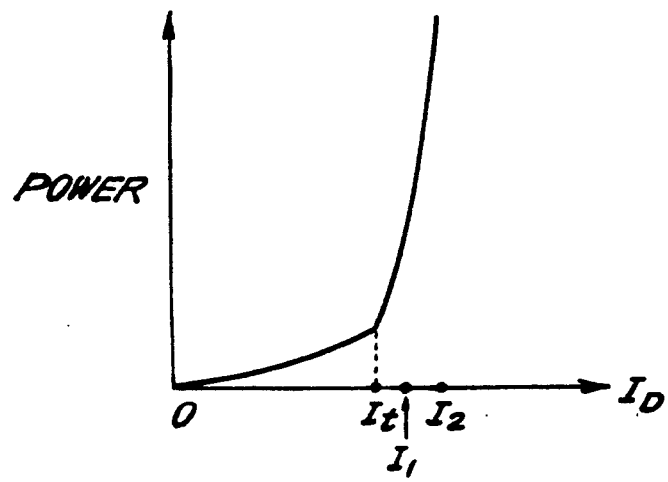
FIG. 5 is a graph of the power output of a semiconductor device used at the light source in the apparatus according to the present invention.

Turning next to FIG. 5, there is shown a graph of the source output of a semiconductor device used as the light source as a function of the driving current Id. In particular, there is shown a transition point It which represents the laser threshold current point. As the laser diode current is increased, the power output due to spontaneous emission increases relatively slowly. After the threshold current its point is crossed, the output increases sharply as laser oscillation begins.

There are two operating current points according to the present invention, I1 and I2, both of which are preferably in the region of laser oscillation. It is also possible to operate at a current in which I1 is in the region of spontaneous emission.

The operation of the present invention in the object sensing mode may be explained as follows. (Operation in other modes is similar and need not be described in detail here). The light source 11 is operated in a low power first mode associated with driving current I1, and the scanning mechanism 13 is operative at, a relatively narrow scanning angle during the first or "detect" mode of operation, such as depicted in FIG. 3a. Although the power is low in the first mode, the beam image produced by the narrow scanning angle makes the light reflecting from the target appear as a short, bright line visible to the user, and thus the light may be used as an aiming beam to enable the user to point at the symbol to be decoded. When the detector circuit 16 determines that a portion of a symbol is in the field of view of the scanning pattern, such as in FIG. 3b, the apparatus switches over to a second mode of operation. In the second mode, the light source 11 is operated in high power associated with driving current I2, and the scanning angle is increased to that depicted in FIG. 3c. Because of the relatively large scanning angles, it is quite likely that the image of the beam on the target will not be visible to the user.

However, since the unit will be operated for only a short period of time in the second mode, the fact that the image of the beam on the target is not visible is not a major drawback.

After the decoding has taken place, the unit will shift back to the first operating mode, as shown in FIG. 3d. The dectector circuit will continue to indicate that the symbol is being scanned. When in object sensing mode, in order to prevent multiple reads of the same symbol, the control circuit contains logic that requires the laser enable signal to go away for a time before starting up the cycle again, and come on again to the wide scan angle. The image of the beam will once again be visible to the user. If no bar code is read during a short time period (e.g. 1 to 10 seconds) it is assumed that the device did not focus on a valid bar code symbol, and the unit will automatically shift back to the first stage of operation so that the user may aim the scanner once again at the bar code symbol.

One embodiment of the present invention allows a scanner to distinguish between a bar code symbol and a regular pattern of light and dark areas such as that formed by printed characters.

Such a feature is particularly important since in most applications the article being scanned has a considerable amount of text in the form of printed characters disposed over the entire surface, in addition to a single bar code symbol. One of the key advantages of the present invention is to allow the scanner to disregard all of the text and be enabled only by the actual bar code symbol.

Although the present invention has been described with respect to linear or single line bar codes, it is not limited to such embodiments, but may also be applicable to stacked or two dimensional bar codes such as Code 49 and similar symbologies. It is conceivable that the scanning method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning characteristics associated with it, e.g. operability at a certain working distance, or operability with a certain density of symbols. The scanning characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implement within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in scanners with adjustable light output and/or scanning angles, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic of specific aspects of this invention and, therefore, such adaptions should and are intended to be comprehended within the meaning and range of equivalence of the following claims.

What is claimed as new and desired to be protected by Letters Patent is set forth in the appended claims.

We claim:

1. A system for reading bar code symbols or the like, comprising scanning means for generating a laser beam directed toward a target producing a narrow angled or spot laser beam that enables the user to manually aim and direct the beam to the location desired by the user and a wide angled laser beam that sweeps an entire symbol to be read, said narrow angled or spot laser beam and said wide angled laser beam being generated from a single laser, and detection means for receiving reflected light from such symbol to produce electrical signals corresponding to data represented by such symbol.

2. A system according to claim 1 wherein said scanning means includes a semiconductor laser light source as said single laser to produce said laser beam.

3. A system according to claim 1 wherein said scanning means moves said laser beam on a first scan path to produce the narrow-angled or spot beam, and on a second scan path with a wide angled beam when reading the symbol.

4. A system according to claim 3 wherein said second scan path is longer than said first scan path, and wherein said first and second scan paths are alternated by changing the scanning angle of said light beam.

5. A method of scanning bar code symbol or the like in a laser scanner comprising the steps of:
   a) providing a fixed or spot laser light beam from a single laser for enabling the user to aim and direct the beam toward a bar code symbol to be read;
   b) scanning a laser light beam produced from said laser on a path along said symbol to read said symbol; and
   c) detecting light reflected from the symbol and generating an electrical signal in response to said reflected light.

6. A method according to claim 5 wherein said step of scanning includes changing the path of said spot laser beam to a wide angled path.

7. A method according to claim 5 further comprising the step of changing the intensity of said light beam.

8. A method according to claim 5 wherein said step of scanning further includes controlling the intensity of said light beam and the length of said path in response to the character of said electrical signal.

9. A system for reading bar code symbols or like targets, comprising:
   (a) scanning means including a single laser for generating a laser beam and directing a first laser beam from said laser in an aiming mode toward a desired location on the target to illuminate a spot-like zone thereon, thereby enabling a user to manually aim and direct the laser beam to the target, and also for directing said laser beam from said laser in a reading mode in a linear path across the target for reflection therefrom; and
   (b) detection means for receiving laser light reflected off the target in the reading mode to produce electrical signals corresponding to data represented by the target.

10. A system according to claim 9, wherein the scanning means includes a semiconductor laser light as said laser to produce the laser beam.

11. A system according to claim 9, wherein the scanning means moves the same laser beam along a first scan path in the aiming mode, and along a second scan path in the reading mode.

12. A system according to claim 9, wherein the second scan path is longer than the first scan path; and wherein the scanning means includes means for alternating between the aiming and reading modes by changing the scanning direction of the laser beam.

13. A method of scanning a bar code symbol or the like, comprising the steps of:
   a) directing a narrow light beam from a single light source toward said symbol to allow a user to aim the light beam toward said symbol;

b) directing a wider scanned light beam from said single light source toward said symbol, the light beam being scanned on a path along said symbol;

c) detecting light reflected from said symbol to provide an electrical representation of said symbol.

14. A method according to claim 13 wherein said light beams are formed by a laser beam.

15. A method according to claim 14 wherein said narrow light beam and said wider light beam are scanned beams of narrow and wider angles from a single semiconductor laser.

16. A bar code scanner comprising:

a) a single light source for directing a narrow light beam toward a bar code symbol to allow a user to aim the light beam toward said symbol;

b) a scanner for directing a wider scanned light beam from said light source toward said symbol, the light beam being scanned on a path along said symbol;

c) a detector responsive to light reflected from said symbol to provide an electrical representation of said symbol.

17. A scanner according to claim 16 wherein said light source is a laser.

18. A scanner according to claim 16 wherein said narrow light beam and said wider light beam are from said light source and scanned by said scanner at narrow and wider angles.

19. A system according to claim 1 wherein said scanning means changes from said narrow angled or spot laser beam to said wide angled laser beam in response to said electrical signals indicating a bar code symbol.

20. A method according to claim 3 wherein said step of scanning is in response to said electrical signal indicating a bar code symbol.

21. A method according to claim 3 wherein said laser is a semiconductor laser diode.

22. A system according to claim 8 wherein said second laser beam is scanned across said target in said reading mode in response to said electrical signal indicating a bar code symbol at said target.

23. A method according to claim 9 wherein said step of directing said wider scanned light beam is performed in response to said electrical signal indicating a bar code symbol.

24. A scanner according to claim 16 wherein said scanner produces said wider scanned light beam in response to said electrical representation of said symbol.

25. A system for reading bar code symbols or the like, comprising symbol detection means for generating a laser beam directed toward a symbol to be read on a target, and for receiving reflected light from such symbol to produce electrical signals corresponding to data represented by the symbol, wherein the improvement comprises means for changing the scanning angle of said light beam so as to change from a bright small line to a longer, but less visible, line on the target sweeping the entire symbol.

* * * * *

UNITED STATES PATENT AND TRADEMARK OFFICE
CERTIFICATE OF CORRECTION

PATENT NO. : 5,250,791
DATED : October 5, 1993
INVENTOR(S) : Heiman, et al

It is certified that error appears in the above-indentified patent and that said Letters Patent is hereby corrected as shown below:

Column 13, lines 48-49, change "patterns An" to --pattern. An--.

Column 16, line 39, delete 'first".

Signed and Sealed this

Twenty-fourth Day of May, 1994

Attest:

BRUCE LEHMAN

*Attesting Officer*  *Commissioner of Patents and Trademarks*